Nov. 10, 1970   R. L. GLIDDEN   3,538,743
SHOCK-TESTING MACHINE CONTROL SYSTEM
Filed Sept. 3, 1968   2 Sheets-Sheet 2

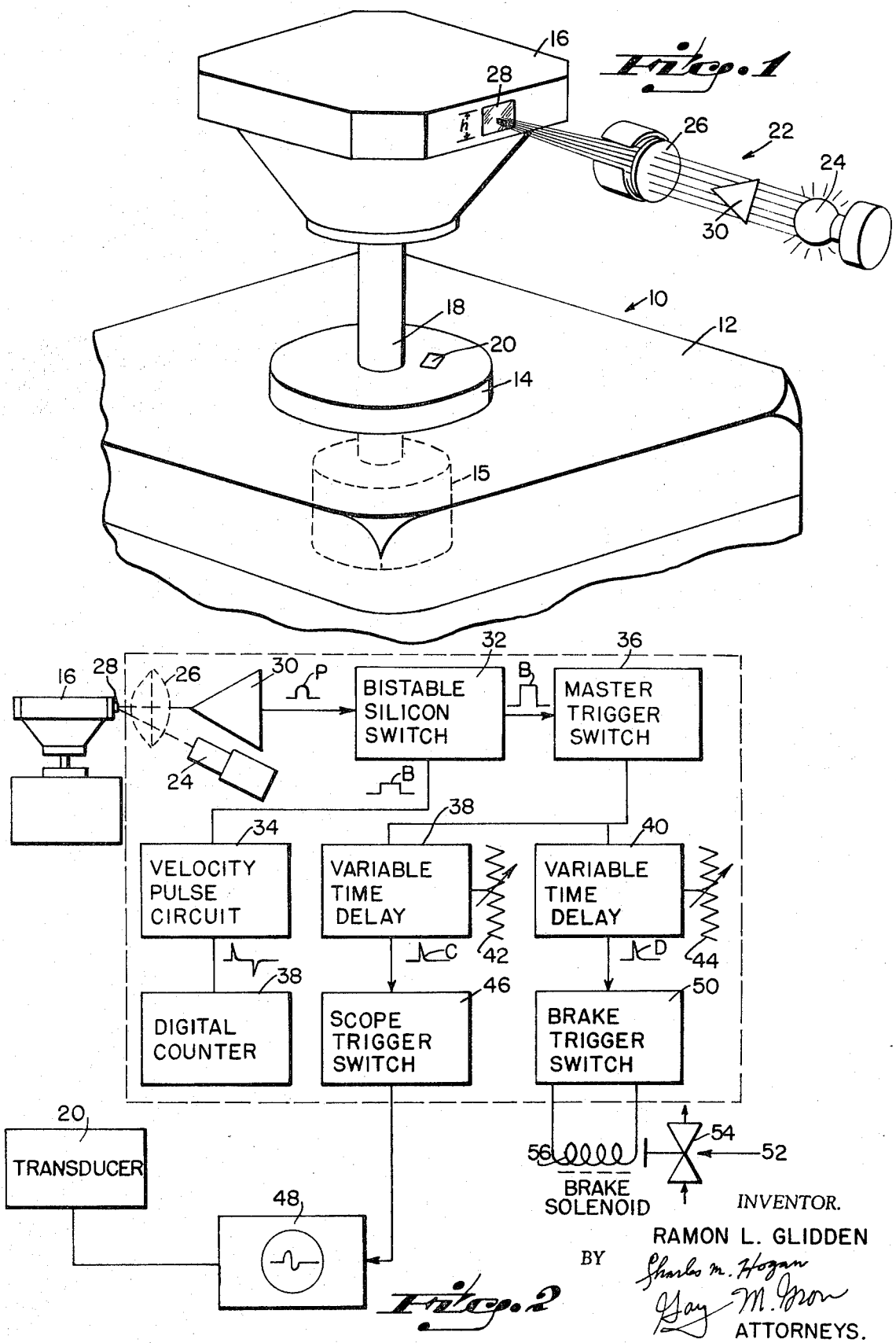

INVENTOR.
RAMON L. GLIDDEN
BY Charles M. Hogan
Gary M. Ison
ATTORNEYS.

United States Patent Office 3,538,743
Patented Nov. 10, 1970

3,538,743
SHOCK-TESTING MACHINE CONTROL SYSTEM
Ramon Luis Glidden, Tulsa, Okla., assignor to Avco Corporation, Tulsa, Okla., a corporation of Delaware
Filed Sept. 3, 1968, Ser. No. 756,930
Int. Cl. G01n *3/00;* G01f *9/00;* G01p *3/68*
U.S. Cl. 73—12               8 Claims

ABSTRACT OF THE DISCLOSURE

The disclosure illustrates an electronic signal-generating device for use in a shock-testing machine having a specimen-supporting carriage that is accelerated against an impact pad to provide a shock impulse on the specimen. The position of the carriage and its velocity adjacent the impact pad is sensed by a photosensitive amplifier which receives a light beam from a reflected surface mounted on the carriage. The output of the photosensitive amplifier is modified to provide a signal proportional to the velocity of the carriage. The output is also used to actuate time-delay devices which are used to control various auxiliary components of the shock-testing machine.

---

The present invention relates to shock-testing machines and more specifically to control components thereof.

Briefly described, a typical shock-testing machine comprises a movable specimen-supporting carriage which is positioned at a given distance from an impact pad. The carriage is then accelerated in a controlled fashion towards the pad, by gravity or by various combinations of gravity and pneumatic or hydraulic systems. When the carriage impacts the pad an acceleration shock pulse is induced in the specimen. The reaction of the specimen to a pulse or a series of pulses is an indication of its structural integrity.

Various auxiliary units are used with the shock-testing machine. One such unit is a brake unit which terminates the motion of the carriage after it rebounds from the impact pad to prevent repeated bounce of the carriage. The brake system is normally actuated just prior to impact of the carriage due to the inherent time delay of the brake mechanism so that the carriage motion is stopped at the top of its rebound. It is necessary to accurately control the actuation of the brake system to prevent further rebound and to prevent a modification of the shock pulse induced by the initial impact.

Another component used with the shock-testing machine is an oscilloscope which receives the output of a transducer mounted in the impact pad of the machine. The sweep circuit of the oscilloscope is triggered when the carriage is at a point closely adjacent to the impact pad. Since the shock pulse exists for an extremely short period of time, the sweep mechanism must be accurately triggered.

Presently, the above auxiliary units are actuated by use of microswitches positioned at a predetermined distance from the impact pad and actuated by movement of the carriage. While microswitches are generally effective in actuating the brake system and the sweep circuit of the oscilloscope, they suffer from the fact that they are not highly accurate. The velocities at which the carriage approaches the impact pad are so great that the mechanical actuation of the microswitch causes a significant variation in the time at which the control signals are applied to the brake and the oscilloscope. In the case of the oscilloscope, the sweep control pulse may vary in such a manner that only part of the acceleration shock pulse is displayed on the oscilloscope. For the brake mechanism the brakes may be energized after several rebounds or in the middle of impact, thereby hampering consistent test results.

Furthermore, microswitches do not lend themselves to long term use because they are subject to wear through repeated mechanical actuation and are subject to shock transmitted to them through the shock-testing machine.

In order to obtain a complete picture of the environment in which the shock test takes place, it is extremely desirable to provide an accurate measure of the velocity of the carriage just prior to impact. The inaccuracy of microswitches as timing devices makes this end virtually impossible. In addition, their mechanical size makes it difficult to install on the carriage of the machine.

Accordingly, it is an object of the present invention to provide a highly accurate control signal device in a shock-testing machine of the type described above to provide various auxiliary control functions.

It is a further object of the invention to provide in a shock-testing machine of the type described above a highly effective and accurate means for indicating the velocity of the movable carriage.

In the broader aspects of the invention the above ends are achieved in a shock-testing machine having a movable specimen-supporting carriage adapted to be accelerated to a high velocity along a given path and rapidly de-accelerated by a retarding force upon reaching a given position by a signal-generating device. The signal-generating device comprises means for projecting a beam of light into the path of the movable carriage adjacent the position where the carriage is rapidly de-accelerated. The light beam means and the carriage are positioned to cooperate to form a resultant light beam whose intensity is changed when the carriage is in motion adjacent the de-acceleration position. A means responsive to changes in light intensity is provided for generating an output control signal. The light-responsive means is positioned relative to the resultant light beam so that movement of the carriage past the position causes the light-responsive means to generate an output signal.

In another form of the invention the objects of the invention are achieved by apparatus as described above, which further comprise a means receiving the output of the signal-generating means for generating an output signal proportional to the velocity of the carriage adjacent the de-acceleration position.

The above and other related objects and features of the present invention will be apparent from a reading of the description of the disclosure shown in the accompanying drawings and the novelty pointed out in the appended claims.

In the drawings:

FIG. 1 illustrates a perspective view of pertinent portions of a shock-testing machine, along with a signal-generating device embodying the present invention;

FIG. 2 is a schematic diagram of a control system used with the shock-testing machine of FIG. 1, the control system embodying the present invention;

Figure 3:
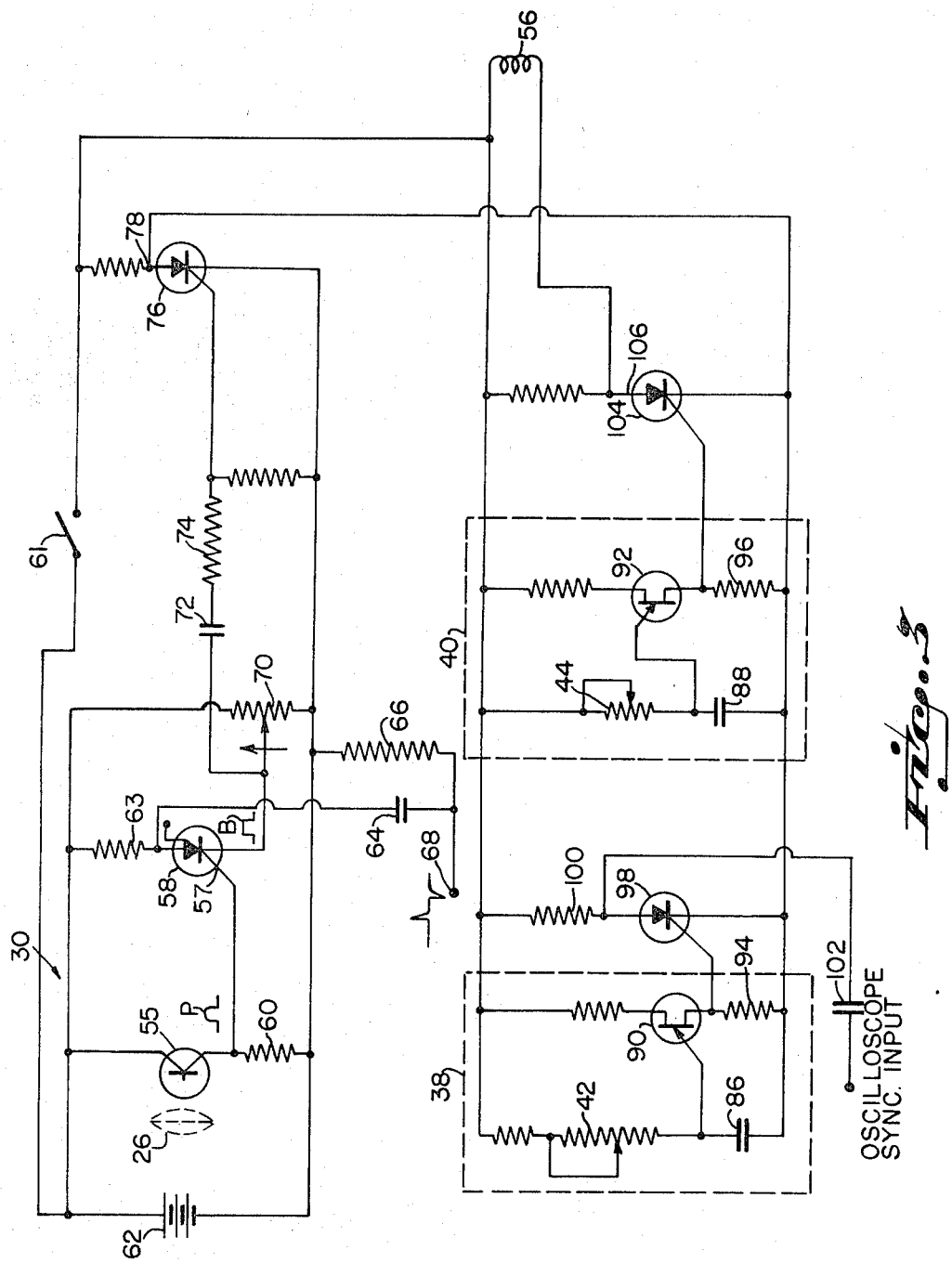
FIG. 3 is a detailed schematic diagram of the control system of FIG. 2.

Referring to FIG. 1 of the drawings there is illustrated a shock-testing machine 10 with which the present invention is used. The shock-testing machine comprises a base 12 having a generally circular impact pad 14 mounted on its top. A movable carriage 16 is guided for movement away from and towards the impact pad 14 by a central column 18. The upper side of the carriage 16 is adapted to support a specimen of a material to be tested.

In operation, the carriage 16 is elevated to a predetermined distance above the impact pad 14. The carriage 16 is then accelerated towards the impact pad 14 by gravity or a combination of gravity and hydraulic forces applied to the lower end of the column 18. The movable carriage 16 then impacts into the pad 14 and the resultant de-acceleration of the carriage imparts a shock pulse to the specimen. The carriage 16 tends to rebound after impact with the pad 14. To prevent further rebound, a brake system, mounted within base 12 and generally indicated by reference character 15, arrests movement of the column 18 to terminate movement of the carriage 16 at the height of its rebound stroke. The acceleration pulse imparted to a specimen is represented on an oscilloscope (shown in FIG. 2) which receives an input from a transducer 20 generally mounted in the impact pad 14. The transducer thus generates an electrical signal upon impact by the carriage 16 which represents the acceleration to which the specimen is subjected.

As stated above, the present practice is to actuate the oscilloscope and the brake mechanism by use of microswitches which are closed by movement of the carriage 16 towards the pad 14. In accordance with the present invention the need for the microswitches is eliminated by the use of the signal-generating device of FIG. 1, generally indicated by reference character 22.

The signal device comprises a light source 24 which, through a lens system 26 projects a beam of light into the path of the movable carriage 16. A reflective surface 28 on the carriage 16 is positioned to reflect the light beam from the lens system 26 onto a photosensitive amplifier 30 only when the carriage 16 is at a given distance closely adjacent the impact pad 14. The resultant change in light intensity applied to the photosensitive amplifier 30, in response to movement of the carriage 16 past the predetermined point, causes the amplifier 30 to generate an output signal. This signal accurately reflects the position of the carriage 16 relative to the pad 14 which enables a highly accurate means for controlling various accessory components of the shock-testing machine 10. Furthermore, the signal-generating device 22 may be isolated from the shock-testing machine 10 to eliminate any transmitted shock or mechanical interference.

In accordance with additional features of the present invention, the signal-generating device 22 may be incorporated with the control system illustrated in FIG. 2. In this arrangement the pulse output P from the amplifier 30 is fed to a bistable silicon switch 32 which produces a generally rectangular output pulse B having a width directly proportional to the width of the pulse P generated by the amplifier 30. The rectangular pulse from the bistable silicon switch 32 is fed to a velocity pulse circuit 34 and a master trigger switch 36.

The velocity pulse circuit 34 is adapted to generate a pair of timing pulses which occur at the beginning and at the end of the rectangular pulse B. The timing pulses are directly proportional to the time period in which the light beam is reflected on the amplifier 30. In order to convert these pulses to a velocity measurement, a predetermined vertical height $h$ is selected for the reflective surface 28. Since the vertical height $h$ of the reflective surface 28 remains constant, the velocity of the carriage 16 prior to impact is a direct measure of the width between the pulses generated by the velocity pulse circuit 34. These pulses may be displayed in an oscilloscope or, as herein shown, to operate a high speed digital counter 38, thereby providing a digital readout of the velocity of the carriage 16.

The master trigger switch 36 is adapted to provide an output, in response to initiation of the pulse B, which turns on first and second variable time-delay circuits 38 and 40. The time-delay circuits 38 and 40, as later shown in detail, have an adjustable time delay by means of a variable resistance 42 and 44, respectively.

The output from the variable time-delay circuit 38 is a vertical pulse C which actuates a scope trigger switch 46. The scope trigger switch 46 in response to the input pulse C generates a votlage which is applied to the external sync input of an oscilloscope 48. As stated previously, the transducer 20, mounted on the pad 14, is connected to the Y axis of the oscilloscope 48. The variable time-delay circuit 38 is then adjusted to produce a time delay which precisely triggers the sweep mechanism of the scope 48 just prior to the impact of the carriage 16 with the pad 14.

The second variable time-delay circuit generates an output pulse D which is applied to a brake trigger switch 50. The brake trigger switch 50, in response to the input pulse D, operates a brake control system, generally indicated by reference character 52, for actuating the brake 15 to terminate motion of the column 18. As herein illustrated, the brake control system 52 comprises a solenoid valve 54 interposed in a pneumatic supply line leading to the brake 15. The valve 54 is closed and opened by a brake solenoid 56 whose electrical power is controlled by the brake trigger switch 50.

The circuit shown in FIG. 3 represents a particularly advantageous arrangement of components which incorporate the control system described above. Referring particularly to FIG. 3, the photosensitive amplifier 30 comprises a phototransistor 55 adapted to receive light through the lens system 26. The collector and emitter of the phototransistor 55 are connected to a source of D.C. power, such as a battery 62. The emitter of the transistor 55 is coupled to the gate 57 of the bistable silicon-controlled switch (SCS) 58. Reflection of light on the photosensitive transistor 55 enables flow of current through a resistor 60 connected in series with the emitter of transistor 55. The resultant voltage change raises the voltage on the gate 57 of the SCS 58, thus permitting flow of the rectangularly shaped pulse B.

The resultant voltage drop across a series-connected resistor 63 is fed through a capacitor 64, in series with a resistor 66. The capacitor and resistor from the velocity pulse circuit 34 and the charge-up and discharge of the capacitor at the beginning and end of the pulse B produces positive and negative voltage pulses at output terminal 68. These pulses are time-spaced proportional to the time the light beam is applied to phototransistor 55. As stated previously, with a given height $h$ for the reflective surface 28, the velocity of the carriage is directly proportional to the spacing of the pulses which are applied to the digital counter 38.

The cathode of the SCS switch 58 is connected to a variable resistor 70 and the voltage which developed across this resistor during activation of the SCS switch 63 is coupled through a capacitor 72 and resistor 74 to the cathode gate of another electronic switch, a silicon-controlled rectifier (SCR) 76. The anode of the SCR switch 76 is connected to the positive terminal of battery 62 via a normally closed switch 61. The SCR switch 76 is turned on by initiation of pulse B, thereby short-circuiting the anode 78 of the silicon-controlled rectifier 76, the negative terminal of battery 62 thereby enabling the source of power 62 to be applied to timing circuits 38, 40. Each of the timing circuits 38, 40 comprises series connected capacitors 86, 88 and the variable resistors 42, 44, respectively. The capacitors 86, 88 are charged up and their charging rate is determined by the value of the resistors 42, 44. The voltage charge across the capacitors 86, 88 is connected to the emitters of uni-junction transistors 90, 92, respectively. When it reaches a predetermined value the transistors 90, 92 fire and permit passage of current pulses through resistors 94, 96.

For timer circuit 38 the voltage drop across the resistor 94 is applied to the gate of an SCR switch 98 which turns it on, thereby producing a current pulse through resistor 100 which is coupled through a capacitor 102 to the external sync input of the oscilloscope 48.

For time-delay circuit 40 the change in voltage across resistor 96 is applied to the gate of an SCR switch 104. This turns the SCR switch 104 on, thereby short-circuiting its anode 106 to the anode 78 of the SCR switch 76. Since the anode 78 of the SCR switch 76 is connected to the negative terminal of battery 62, the anode 106 of SCR switch 104 is also connected to the negative terminal of battery 62. The brake solenoid 56 is connected to the positive terminal of battery 62 via switch 61 and to the anode 106 of SCR switch 104. When the SCR switch 104 is turned on, the brake solenoid is supplied with power from the battery to initiate operation of the brake. For simplification purposes the solenoid is shown as energized by the battery 62, but in practice the solenoid may be energized by an exterior source of power through suitable control circuitry.

In the electronic circuit described above the time delays for initiation of the oscilloscope sync input and the energization of the brake solenoid circuit are easily selected by varying the value of resistors 42, 44. When a test cycle has been completed the switch 61 is momentarily opened to remove power from SCR switch 76, SCR switch 104, and the time-delay circuits 38, 40 to reset the elements to their initial state. A subsequent cycle may then be started to repeat the above operation.

The signal-generating device described above and the associated control circuits with which it may be used, enable a significant increase in the scope and accuracy of information obtainable from a shock-testing machine.

The use of a photosensitive amplifier and its control circuit to detect velocity enables a highly accurate measurement of velocity which has not been possible in the past. This capability becomes particularly significant when one considers that velocities attained by the movable carriage may be in excess of a thousand inches per second. It has been found that the signal-generating device and its associated electronic circuit can measure this velocity with an extremely low percentage of error. Furthermore, with the signal-generating device and circuitry shown it is possible with suitable adjustments to accurately measure the velocity of the carriage as it rebounds from the impact pad 14 so that the reflective surface causes light to be applied to the photosensitive amplifier 30.

By isolating the photosensitive device which actuates the oscilloscope sweep mechanism and the brake mechanism, the adverse effects of unwanted shock impulses and mechanical actuation is eliminated. This enables use of the device for prolonged periods of time without the need for replacement since there is no mechanical actuation of the signal-generating device by the shock-testing machine carriage.

While the preferred embodiment of the present invention has been described, it is apparent to those skilled in the art that modifications may be performed without departing from the spirit of the present invention. Accordingly, its scope is to be determined solely by the appended claims.

Having thus described the invention, what is claimed as novel and desired to be secured by Letters Patent of the United States is:

1. In a shock-testing machine having a movable specimen-supporting carriage adapted to be accelerated to a high velocity along a given path and rapidly de-accelerated by a retarding force upon reaching a given position, a signal-generating device responsive to movement of said carriage adjacent said position, said device comprising:
   means for projecting a beam of light into the path of said movable carriage adjacent the position where said carriage is rapidly de-accelerated;
   means mounted on said movable carriage for reflecting said projected light beam, said reflecting means having a predetermined dimension in a direction parallel to the path of said carriage;
   means responsive to changes in light intensity for generating an output control signal, said light-responsive means being positioned relative to said reflected light beam so that movement of the carriage past said position causes said light-responsive means to generate an output signal, said control signal means generating an output signal proportional to the dimension of said reflecting means and the velocity of said carriage.

2. Apparatus as in claim 1 wherein said shock-testing machine further includes brake means for terminating the movement of said carriage after said carriage has been de-accelerated and wherein said signal-generating device is adapted to actuate said brake means at a given period of time after movement of said carriage adjacent said given position.

3. Apparatus as in claim 2 wherein said shock-testing machine comprises an abutment means in the path of said carriage at said given position for rapidly de-accelerating said carriage upon impact therewith, and wherein:
   said brake-actuating means includes means for delaying the time at which said brake means is actuated so that movement of said carriage is terminated after said carriage has impacted said abutment means.

4. Apparatus as in claim 1 wherein said shock-testing machine further includes means for rapidly indicating the change in acceleration of said movable carriage and wherein said signal-generating means is adapted to initiate operation of said acceleration indicating means.

5. Apparatus as in claim 4 wherein said shock-testing machine comprises an abutment means in the path of said carriage at said given position for rapidly de-accelerating said carriage upon impact therewith, and wherein said acceleration-indicating means comprises:
   a transducer mounted on said abutment means for generating an electrical signal proportion to the de-acceleration of said carriage upon impact with said abutment means;
   an oscilloscope receiving the output of said transducer for generating a waveform proportional to the de-acceleration of said carriage;
   said signal-generating means is adapted to generate an electrical output signal for triggering the sweep mechanism of said oscilloscope.

6. Apparatus as in claim 1 wherein said velocity signal means comprises:
   means coupled to said light-responsive means for producing a generally rectangular current pulse having a width proportional to said time period;
   means coupled to said rectangular current pulse means for producing a pair of vertical pulses separated proportional to said time period;
   whereby said vertical pulses may be used to actuate a a digital counting device to produce a digtal total proportional to the velocity of said carriage.

7. Apparatus as in claim 6 wherein said shock-testing machine further includes brake means for terminating movement of said carriage after said carriage has de-accelerated and means for indicating the de-acceleration of said carriage after said carriage passes said position, and wherein said signal-generating device further comprises:
   a first time-delay circuit for producing an electrical control signal for actuation of said brake means at a predetermined time period after receiving an electrical input signal;
   a second time-delay circuit for producing a control signal for actuation of said de-acceleration indicating means at a predetermined time period after receiving an electrical input signal;
   means responsive to initiation of said rectangular pulse for applying electrical input signals to said time-delay circuits.

8. Apparatus as in claim 7 wherein said shock-testing machine comprises an abutment means in the path of said carriage at said given position for rapidly de-accelerating said carriage upon impact therewith, and wherein said acceleration indicating means comprises:
   a transducer mounted on said abutment means for generating an electrical signal proportional to the de-acceleration of said carriage upon impact with said abutment means;
   an oscilloscope receiving the output of said transducer for generating a waveform proportional to the deacceleration of said carriage;

said second time-delay circuit is adapted to produce an electrical output signal for triggering the sweep mechanism of said oscilloscope.

References Cited
UNITED STATES PATENTS

| | | | |
|---|---|---|---|
| 2,056,372 | 10/1936 | Schwartz | 274—1 |
| 2,332,300 | 10/1943 | Cook | 161—15 |
| 2,413,076 | 12/1946 | Schick | 317—124 |
| 3,435,658 | 4/1969 | Arthur | 73—12 |
| 2,866,935 | 12/1958 | Robillard | 324—102 |
| 2,946,931 | 7/1960 | Durbin | 317—124 |
| 3,103,116 | 9/1963 | Kohli | 73—12 |
| 3,106,834 | 10/1963 | Parstorfer | 73—12 |
| 3,187,701 | 6/1965 | Heidt et al. | 112—219 |
| 3,190,110 | 6/1965 | Craycraft | 73—12 |

OTHER REFERENCES

Avco-Shock Test Machine, Avco Corp., Oct. 18, 1963.

RICHARD C. QUEISSER, Primary Examiner

J. WHALEN, Assistant Examiner

U.S. Cl. X.R.

73—418; 324—70